April 12, 1927.

A. W. COPLAND 1,624,316

DOUGH DEPOSITING MACHINE

Filed Jan. 22, 1923   2 Sheets-Sheet 1

Inventor
Alexander W. Copland

By Whittemore Hulbert Whittemore Belknap
Attorneys.

April 12, 1927.
A. W. COPLAND
1,624,316
DOUGH DEPOSITING MACHINE
Filed Jan. 22, 1923  2 Sheets-Sheet 2
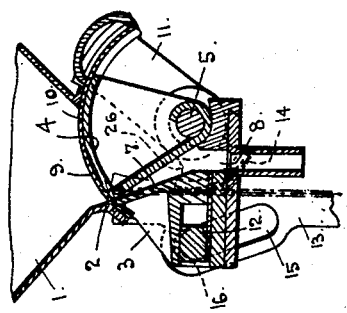
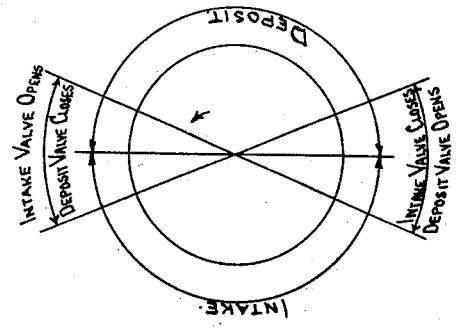
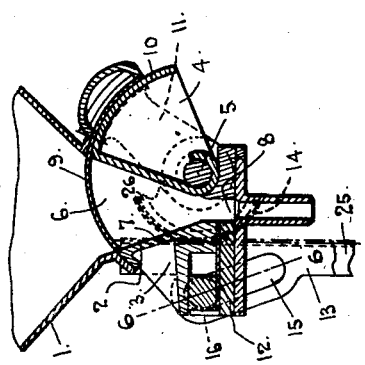
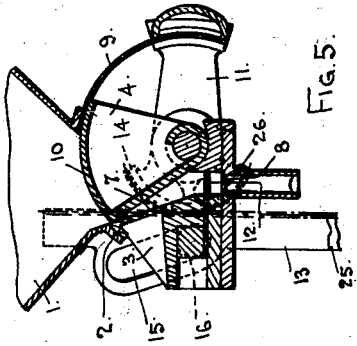
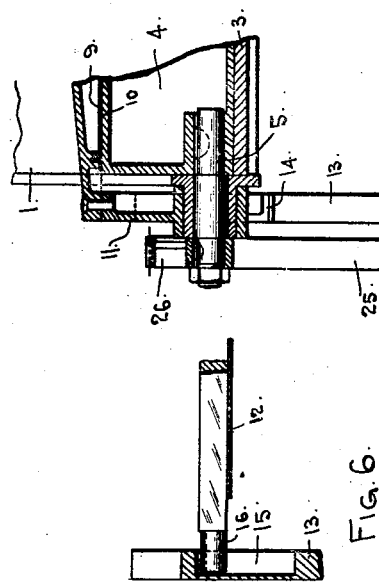
Inventor
Alexander W. Copland Patented Apr. 12, 1927.

1,624,316

UNITED STATES PATENT OFFICE.

ALEXANDER W. COPLAND, OF DETROIT, MICHIGAN.

DOUGH-DEPOSITING MACHINE.

Application filed January 22, 1923. Serial No. 614,238.

The invention relates to dough depositing machines and refers particularly to that type having an expansible measuring chamber. The invention has for its main object the provision of a machine of this type in which the measuring and depositing of the dough is effected with as gentle a motion as possible to avoid changing the consistency of the dough. Other objects are the provision of a casing forming an expansible measuring chamber and having a variable capacity; the provision of a measuring chamber which may be alternately contracted and expanded with the greatest movement occurring at its entrance end, so that when expanded, it has a progressively decreasing cross sectional area from its entrance end to its discharge end and when contracted it has a progressively increasing cross sectional area from its entrance end to its discharge end; the provision of an oscillatory plunger forming a movable side wall of the chamber; the provision of a severing blade for separating the dough in the chamber from the dough in the superposed hopper; and the provision of a valve for controlling the discharge of the dough from the chamber.

With the above and other objects in view, the invention resides in the novel features of construction and combinations and arrangements of parts as more fully hereinafter set forth.

In the drawings:

Figure 2 is an enlarged cross section on the line 2—2 of Figure 1;

Figures 3, 4 and 5 are enlarged sectional views showing the dough measuring and depositing mechanism;

Figure 6 is a cross section on the line 6—6 of Figure 3;

Figure 7 is a diagram showing the cycle of operations.

Figure 1:
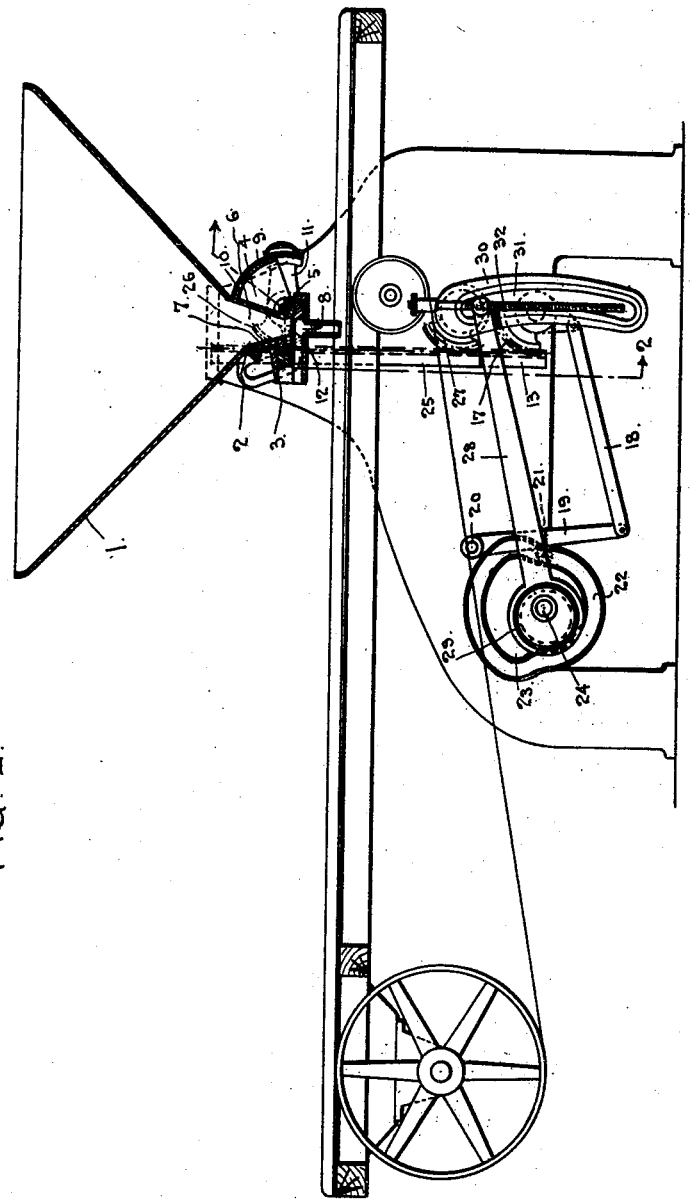
Figure 1 is a side elevation partly in section of a dough depositing machine embodying my invention.

1 is the hopper and 2 the casing forming the expansible measuring chamber at its lower end and comprising the stationary section 3 and the oscillatory section or plunger 4 which is keyed at its opposite ends upon the stub shafts 5, and is movable between the parallel end walls 6 of the stationary section toward the downwardly and inwardly inclined side wall 7. The inclined side wall and the plunger lead to the discharge opening 8 in the lower end of the stationary section, the arrangement being such that in oscillating the plunger, the greatest movement thereof takes place at its upper or entrance end so that when expanded it has a progressively decreasing cross sectional area from its entrance end to its discharge end and when contracted it has a progressively increasing cross sectional area from its entrance to its discharge ends. As a consequence, the dough may freely flow into the expansible chamber and its discharge therefrom is facilitated.

9 is an oscillatory curved blade slidable over the curved outer wall 10 of the plunger, both the blade and outer wall being concentric relative to the axis of rotation of the plunger. This blade has a sharpened forward end for severing the dough and is carried upon the arms 11 at opposite ends of the plunger which are journalled upon the shaft 5. 15 is a reciprocable valve slidably mounted in the stationary section 3 and adapted to extend across the discharge opening 8 to control the flow of the dough from the expansible chamber 2.

In operation, with the parts in positions indicated in Figure 1, the dough completely filling the expansible chamber 2, the severing blade 9 is first advanced across the lower end of the hopper to sever the dough. During the inward movement of the blade, the valve 12 is being withdrawn from the discharge opening so that when the blade has completely severed the dough, the valve has completely moved to its open position, the parts then occupying the positions shown in Figure 3. Then, as shown in Figure 4, the plunger is oscillated to swing the same inwardly, forcing the dough from the expansible chamber through the discharge opening 8. Upon the completion of this movement, the blade 9 and valve 12 are returned to their original positions as shown in Figure 5, after which the plunger 4 is swung back to its original position, the dough entering the expansible chamber from the superposed hopper owing both to gravity and to suction created by the return movement of the plunger.

The mechanism for oscillating the blade 9 and the plunger 4 as well as reciprocating the valve 12, is alike at each side of the machine and in detail is as follows: 13 is a vertically extending rack having its teeth intermeshing with the teeth of the segment 14 secured to and preferably integral with an arm 11 carrying the blade 9. This rack also has near its upper end the inclined elongated recess 15 which is engaged in by the pin 16 extending beyond an end of and secured to the valve 12. The arrangement is such that upon upward movement of the rack 13, the toothed segment 14 with the blade 9 is rotated in a clockwise direction to swing the blade out of separating position and the valve 12 is moved inwardly across the discharge opening 8. Upon downward movement of the rack, the segment with the blade is rotated in a counterclockwise direction to swing the blade across the lower end of the hopper and the valve is moved in the opposite direction to clear the discharge opening. 17 is a second toothed segment journalled on the machine frame and having its teeth intermesh with the teeth at the lower end of the rack 13, this toothed segment being rocked by the link 18 pivotally connected thereto and also to the lever 19 pivoted upon the machine frame at 20 and having the roller 21 engaging in the cammed groove 22 of the cam member 23. This cam member is secured upon the shaft 24 which is driven from the motor through suitable mechanism (not shown). 25 is a second vertically extending rack having its teeth intermeshing with the teeth of the segment 26 keyed upon an end of the shaft 5. The teeth at the lower end of this rack intermesh with the teeth of a segment 27 journalled upon the machine frame and rocked by the rod 28 which has one end pivotally connected to the eccentric member 29 and the other end pivotally connected to the arm 30 secured to the toothed segment. The eccentric member is secured upon the shaft 24 and is therefore rotated at the same rate as the cam member 23. To vary the oscillatory movement of the plunger, the pivotal connection between the rod 28 and the arm 30 is adjustable, this being secured by providing the arm with the elongated opening 31 concentric with the shaft 24 in which the pivot is adjustably secured by means of the threaded rod 32 mounted in the arm. Thus with this adjustable connection, the capacity of the expansible measuring chamber may be readily varied.

What I claim as my invention is:

1. In a dough depositing machine, the combination with a hopper having an expansible chamber at its lower end, said chamber comprising a stationary section having a discharge opening in its lower end in substantial alignment with said hopper, and an oscillatory plunger cooperating therewith, of a curved blade at the free end of said plunger movable into and out of said hopper, a valve movable across said discharge opening, and means for moving said blade across the lower end of said hopper to sever the dough and said valve outwardly to clear said discharge opening, for oscillating said plunger to swing the same inwardly, for returning said blade and valve to their starting points, and for oscillating said plunger to its starting point.

2. In a dough depositing machine, the combination with a hopper, of a measuring chamber below said hopper having a discharge end in substantial alignment therewith, and inwardly inclined walls for decreasing the cross sectional area of the hopper towards said discharge end, a cut off blade movable between said hopper and measuring chamber, means for alternately contracting and expanding said chamber with the greatest movement at the entrance end, a valve at the discharge end of said chamber, and means for operating said cut off blade, contracting means and valve in timed relation to measure, cut off and deposit a predetermined quantity of dough.

3. In a dough depositing machine the combination with a hopper having continuous tapering sides and a valve at the lower end thereof, of a cut off blade movable through said hopper to form a measuring chamber between said blade and said valve, one of the walls of said measuring chamber being pivotally mounted near the lower end of said hopper, and means for oscillating said movable wall to contract said chamber and eject the dough therefrom in the same general direction as it entered.

In testimony whereof I affix my signature.

ALEXANDER W. COPLAND.